US007839544B2

(12) United States Patent
Ando

(10) Patent No.: US 7,839,544 B2
(45) Date of Patent: Nov. 23, 2010

(54) FACSIMILE APPARATUS AND METHOD OF MODE SWITCHING AND MEMORY CONTROL TO MAINTAIN THE CONTINUOUS PRINTING OF FACSIMILE DATA

(75) Inventor: Motonobu Ando, Aichi (JP)

(73) Assignee: Brother Kogyo Kabushiki Kaisha, Aichi (JP)

( * ) Notice: Subject to any disclaimer, the term of this patent is extended or adjusted under 35 U.S.C. 154(b) by 679 days.

(21) Appl. No.: 11/606,149

(22) Filed: Nov. 30, 2006

(65) Prior Publication Data
US 2007/0121156 A1 May 31, 2007

(30) Foreign Application Priority Data
Nov. 30, 2005 (JP) .............................. 2005-346505

(51) Int. Cl.
H04N 1/40 (2006.01)
(52) U.S. Cl. .................. 358/501; 358/404; 358/444; 358/468; 399/85
(58) Field of Classification Search ................ 358/402, 358/404, 426.05, 426.06, 444, 468, 437; 399/85, 87
See application file for complete search history.

(56) References Cited
U.S. PATENT DOCUMENTS

| 4,907,094 | A | * | 3/1990 | Mishima et al. | 358/437 |
| 5,177,620 | A | * | 1/1993 | Fukushima | 358/404 |
| 5,481,374 | A | * | 1/1996 | Tachibana et al. | 358/444 |
| 5,483,353 | A | * | 1/1996 | Kudou | 358/404 |
| 5,621,540 | A | * | 4/1997 | Terajima | 358/404 |
| 5,675,422 | A | * | 10/1997 | Hara et al. | 358/404 |
| 5,778,163 | A | * | 7/1998 | Terajima | 358/1.14 |
| 5,812,746 | A | * | 9/1998 | Mishima et al. | 358/1.14 |
| 5,898,824 | A |   | 4/1999 | Kato et al. |  |
| 5,923,442 | A | * | 7/1999 | Miyaoka | 358/442 |
| 6,016,387 | A | * | 1/2000 | Yoshida | 358/1.16 |

(Continued)

FOREIGN PATENT DOCUMENTS

JP      5-30263 A      2/1993

(Continued)

OTHER PUBLICATIONS

Machine Translation of Sato, Isamu (Japanese Patent Publication 8-88702A) published Apr. 2, 1996, accessed Apr. 30, 2009.*

(Continued)

Primary Examiner—Kimberly A Williams
(74) Attorney, Agent, or Firm—McDermott Will & Emery LLP

(57) ABSTRACT

A facsimile apparatus is provided with a receiver that receives facsimile data, a storage unit including a data memory region that stores therein the facsimile data, a printing unit that prints an image based on the facsimile data, and a printing controller that controls the printing unit, during receipt of the facsimile data, to alternately operate in a standby mode in which a printing action is suspended and allowing the facsimile data corresponding to a plurality of pages to be stored in the storage unit, and in a continuous mode in which the facsimile data corresponding to the plurality of pages stored in the storage unit is continuously printed out by the printing unit.

19 Claims, 6 Drawing Sheets

U.S. PATENT DOCUMENTS

| | | | |
|---|---|---|---|
| 6,055,067 A * | 4/2000 | Matsuda et al. | 358/468 |
| 6,144,459 A | 11/2000 | Satou | |
| 6,160,636 A * | 12/2000 | Nagano et al. | 358/412 |
| 6,512,599 B1 * | 1/2003 | Hattori | 358/442 |
| 6,570,667 B1 * | 5/2003 | Hattori et al. | 358/1.15 |
| 6,819,889 B2 * | 11/2004 | Okuda | 399/67 |
| 6,943,912 B1 * | 9/2005 | Kamei et al. | 358/1.16 |
| 2002/0051168 A1 * | 5/2002 | Yashiki | 358/1.15 |
| 2002/0186421 A1 * | 12/2002 | Tachibana | 358/437 |
| 2004/0218225 A1 * | 11/2004 | Kim | 358/400 |
| 2008/0080014 A1 * | 4/2008 | Shimamoto | 358/442 |

FOREIGN PATENT DOCUMENTS

| | | |
|---|---|---|
| JP | 6-105172 A | 4/1994 |
| JP | HEI 8-88702 | 4/1996 |
| JP | 8-279887 A | 10/1996 |
| JP | HEI 9-139787 | 5/1997 |
| JP | 11-205526 A | 7/1999 |
| JP | 2004-274551 A | 9/2004 |
| JP | 2005-117386 A | 4/2005 |

OTHER PUBLICATIONS

Japanese Notification of Reasons of Rejection issued in Patent Application No. 2005-346505 dated on Jun. 6, 2008.

* cited by examiner

FACSIMILE APPARATUS AND METHOD OF MODE SWITCHING AND MEMORY CONTROL TO MAINTAIN THE CONTINUOUS PRINTING OF FACSIMILE DATA

CROSS-REFERENCE TO RELATED APPLICATION

This application claims priority from Japanese Patent Application No. 2005-346505, filed on Nov. 30, 2005, the entire subject matter of which is incorporated herein by reference.

BACKGROUND OF THE INVENTION

1. Technical Field

The present invention relates to a facsimile apparatus.

2. Related Art

In the field of facsimile apparatuses that prints out facsimile data (hereinafter, the term "facsimile" may be expressed as "FAX" occasionally) received from outside via a communication network, printing speed of the apparatus has been upgraded so much that these days the printing speed is generally faster than receiving speed of the FAX data. For this reason, some facsimile apparatuses have a function of intermittent printing executed when receiving the FAX data corresponding to a plurality of pages. Such facsimile apparatuses are typically configured to: start a printing action upon receiving the data corresponding to one page; suspend the printing action upon completing the printing of the page and waiting for completion of receipt of the next page, and restart the printing action upon receiving the data corresponding to the next page. When such intermittent printing is performed, the operating noise causes uncomfortable sensation in persons around the facsimile apparatus, and besides the discomfort of the noise is increased because of the starting and stopping actions repeated at short intervals.

To alleviate such a problem, for example Japanese Patent Provisional Publication No. HEI 11-205526 (hereinafter, referred to as '526 publication) proposes storing the FAX data in a memory when receiving the data corresponding to a plurality of pages, and starting to print out the FAX data either upon full receipt of the FAX data including all the pages, or when the memory region is fully occupied by the data being received. Such printing mode allows successively printing the FAX data for a plurality of pages, thus reducing the number of times of starting and stopping the printing action.

According to the printing mode proposed in '526 publication, however, once the printing action is started as the memory region is fully occupied during the receipt of the FAX data, the printing action is continued until the FAX data stored in the memory is cleared firstly. Thereafter, the printing action is started and stopped each time the FAX data for one page is received. Accordingly, '526 publication does not provide a satisfactory solution for the problem in the intermittent printing.

SUMMARY OF THE INVENTION

Aspects of the present invention provide an improved facsimile apparatus in which the intermittent printing is controlled effectively.

BRIEF DESCRIPTION OF THE ACCOMPANYING DRAWINGS

FIG. 1 schematically shows a cross-sectional side view of a facsimile apparatus according to a first embodiment of the invention.

DESCRIPTION

General Overview

Figure 1:
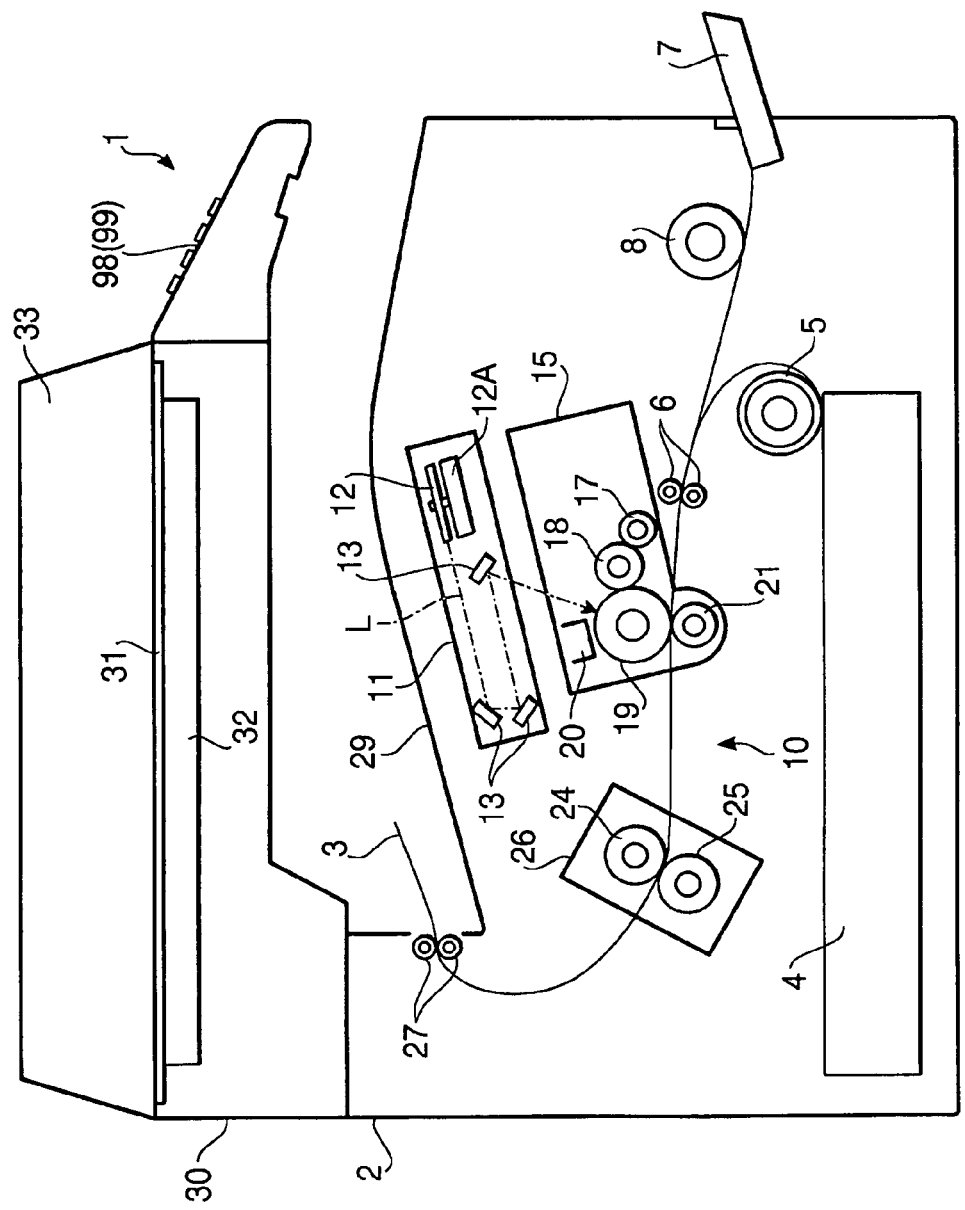

It is noted that various connections are set forth between elements in the following description. It is noted that these connections in general and unless specified otherwise, may be direct or indirect and that this specification is not intended to be limiting in this respect. Aspects of the invention may be implemented in computer software as programs storable on computer-readable media including but not limited to RAMs, ROMs, flash memory, EEPROMs, CD-media, DVD-media, temporary storage, hard disk drives, floppy drives, permanent storage, and the like.

According to aspects of the invention, there is provided a facsimile apparatus, which is provided with a receiver that receives facsimile data, a storage unit including a data memory region that stores therein the facsimile data, a printing unit that prints an image based on the facsimile data, and a printing controller that controls the printing unit, during receipt of the facsimile data, to alternately operate in a standby mode in which a printing action is suspended and allowing the facsimile data corresponding to a plurality of pages to be stored in the storage unit, and in a continuous mode in which the facsimile data corresponding to the plurality of pages stored in the storage unit is continuously printed out by the printing unit.

According to the above configuration, the printing unit alternately operates in the standby mode and in the continuous mode. Such arrangement permits the printing unit to continuously print, after once starting the printing action and suspending, the FAX data corresponding to a plurality of pages after the FAX data corresponding to the plurality of pages is fully received, instead of starting and suspending the printing action each time the FAX data for one page is received, thereby effectively restricting the intermittent printing.

The printing controller may switch the printing mode from the continuous mode to the standby mode when an amount of the facsimile data stored in the storage unit is equal to or less than a first threshold value.

According to the above configuration, the printing unit is switched to operate in the standby mode when the amount of the FAX data stored in the storage unit decreases to a predetermined level, and once the facsimile data corresponding to a plurality of pages is accumulated in the storage unit, the printing unit is switched to operate in the continuous mode, which effectively restricting the intermittent printing.

The printing controller may switch the printing mode from the standby mode to the continuous mode when an available capacity of the data memory region in the storage unit is equal to or less than a second threshold value.

According to the third aspect, the FAX data is accumulated while a sufficient vacant capacity is available in the storage unit, and the printing unit starts operating in the continuous mode when the vacant capacity of the storage unit decreases to a predetermined level. Such arrangement prevents occurrence of an error originating from shortage of the vacant capacity in the storage unit.

When the capacity of the data memory region in the storage unit becomes equal to or less than a third threshold value, the printing controller may cause the printing unit to alternately perform a second standby mode in which the printing action is suspended and waiting for the facsimile data corresponding to a unit amount to be stored in the storage unit, and in unit printing mode in which a unit printing action of printing the facsimile data corresponding to the unit amount stored in the storage unit.

According to the above configuration, when the capacity of the data memory region in the storage unit decreases to a predetermined level, the printing unit performs the unit printing action of printing the FAX data corresponding to a predetermined unit each time the FAX data corresponding to the predetermined unit is stored in the storage unit. Such arrangement prevents occurrence of an error originating from shortage of the capacity in the storage unit.

According to aspects of the invention, there is provided a facsimile apparatus which is provided with a receiver that receives facsimile data, a storage unit including a data memory region that is configured to store therein the facsimile data, a connector that provides connection with an external storage unit that is configured to store therein the facsimile data, a printing unit that prints an image based on the facsimile data, a memory controller that stores the facsimile data received by the receiver in one of the storage unit and the external storage unit, and a printing controller that controls the printing unit, during receipt of the facsimile data, to operate in a standby mode in which a printing action is suspended and the memory controller controls the facsimile data corresponding to a plurality of pages to be stored in the one of the storage unit and the external storage unit, and in a continuous mode in which the facsimile data corresponding to the plurality of pages stored, under control of the memory controller, in the one of the storage unit and the external storage unit is continuously printed out by the printing unit.

According to the above configuration, the facsimile apparatus can employ the external storage unit in addition to the storage unit, thereby storing a greater amount of FAX data at a time. Such arrangement enables continuously printing a larger number of pages, thereby enhancing the capability of restricting the intermittent printing.

The printing controller may cause the printing unit to alternately operate in the standby mode and in the continuous mode.

According to above configuration, the printing unit starts performing the continuous printing action when, for example, the vacant capacity of both of the storage unit and the external storage unit decreases to a predetermined level, during the receipt of the FAX data under the standby mode. Such arrangement prevents occurrence of an error originating from shortage of the storage capacity. After completion of the continuous printing action the standby mode is performed until the FAX data corresponding to a plurality of pages is stored in the storage unit or in the external storage unit, which is again followed by the continuous printing action, which effectively restricts the intermittent printing.

The memory controller may first store the facsimile data in one of the storage unit and the external storage unit when receiving the facsimile data, and successively store the facsimile data in the other of the storage unit and the external storage unit when an available capacity of the one of the storage unit and the external storage unit becomes equal to or less than a fourth threshold value.

The memory controller may first store the facsimile data in the storage unit when receiving the facsimile data, and successively store the facsimile data in the external storage unit when an available capacity of the storage unit becomes equal to or less than the fourth threshold value.

According to the above configuration, the facsimile apparatus first stores the FAX data in the storage unit upon starting to receive the FAX data, and then successively stores the FAX data in the external storage unit when the vacant capacity of the storage unit decreases to a predetermined level. Employing thus the storage unit with priority alleviates the load imposed on the part of the external storage unit.

The connector may provide connection with an information processor having an internal memory, the memory controller being configured to utilize the internal memory as the external storage unit.

The connector may provide connection with an information processor to which an external memory is removably attachable, the memory controller being configured to utilize the external memory as the external storage unit.

According to the above configuration, the memory controller can utilize as the external storage unit the internal memory installed in the information processor, as well as the external memory connected to the information processor. Such arrangement allows storing a greater amount of FAX data at a time, thereby further enhancing the capability of restricting the intermittent printing.

According to aspects of the invention, there is provided a facsimile apparatus, which is provided with a receiver that receives facsimile data, a storage unit including a data memory region that stores therein the facsimile data, a printing unit that prints an image based on the facsimile data, and a printing controller that switches an operation of the printing unit, during receipt of the facsimile data, between a continuous printing mode in which the facsimile data corresponding to a plurality of units is stored in the storage unit and then the facsimile data corresponding to the plurality of units are continuously printed, and a unit printing mode in which the facsimile data corresponding to a unit is printed every time when the facsimile data corresponding to a unit is stored in the storage unit. The continuous printing mode and the unit printing mode are switched according to a time zone.

According to the above configuration, the facsimile apparatus may be programmed such that, for example, the unit printing mode is selected so as to alleviate the load of the storage unit, during the daytime when the storage unit is more prone to incur shortage in capacity because a number of users utilize the facsimile apparatus in various manners, and the continuous printing mode is selected so as to restrict the intermittent printing, during the night time when quietness is of primary importance.

In the facsimile apparatus described above, the printing unit may be configured to print the image in accordance with an electrophotographic image formation method.

According to the above configuration, since the facsimile apparatus based on the electrophotography produces a greater noise when performing the printing action and takes a longer time for preparation of the printing action compared with other systems, applying the present invention to the facsimile apparatus based on the electrophotography provides an especially advantageous effect.

EMBODIMENTS

First Embodiment

Hereunder, a facsimile apparatus according to a first embodiment of the present invention will be described referring to FIGS. 1 through 6. FIG. 1 is a cross-sectional side view schematically showing a facsimile apparatus 1 according to a first embodiment of the present invention. In the following description, the right-hand side in FIG. 1 will be referred to as a front side of the facsimile apparatus 1.

The facsimile apparatus 1 according to the first embodiment is provided with a laser printing unit having both a facsimile function and a printing function. The facsimile apparatus 1 includes a generally box-shaped main body casing 2, and on a bottom portion of the main body casing 2, a paper feed tray 4 that carries thereon papers 3 on which an image is to be formed is provided so as to be drawn out in a forward direction. At a position above the front edge of the paper feed tray 4, a paper feed roller 5 is located, so that rotation of the paper feed roller 5 conveys a topmost sheet of the papers 3 stacked on the paper feed tray 4 to a resist roller 6 located backwardly above paper feed roller 5. On a front face of the main body casing 2 a manual feed tray 7 is provided, so that the paper 3 delivered from the manual feed tray 7 is conveyed also to the resist roller 6, via rotation of a manual paper feed roller 8. The resist roller 6 corrects an orientation of the paper 3, and conveys the paper 3 to between a photoconductive drum 19 and a transfer roller 21 at a predetermined timing.

The main body casing 2 includes therein an image formation unit 10 that forms an image on the paper 3, located above the paper feed tray 4. The image formation unit 10 includes a scanning unit 11, a process cartridge 15, a fixing unit 26 and so forth.

The scanning unit 11 includes a laser emitter (not shown), a polygon mirror 12 rotationally driven by a scanner motor 12A, a plurality of reflecting mirrors 13 and a plurality of lenses (not shown), so as to irradiate a surface of the photoconductive drum 19 with a laser beam emitted by the laser emitter, via the polygon mirror 12, the reflecting mirrors 13 and the lenses.

The process cartridge 15 is removably installed in the main body casing 2. The process cartridge 15 includes a toner chamber (not shown) in which a toner ("developer" of the present invention) is stored, a supply roller 17, a developing roller 18 ("development unit" of the present invention), the photoconductive drum 19 ("image carrier" of the present invention), a scorotron charger 20, and the transfer roller 21 ("transfer unit" of the present invention).

The toner delivered from the toner chamber is supplied to the developing roller 18 via rotation of the supply roller 17, being positively charged by friction between the supply roller 17 and the developing roller 18 The surface of the photoconductive drum 19 is uniformly charged positively by the scorotron charger 20 while rotating, and exposed to the laser beam L from the scanning unit 11, so that a static latent image, corresponding to an image to be formed on the paper 3, is formed on the surface of the photoconductive drum 19. Then via rotation of the developing roller 18 the toner thereon is supplied to the surface of the photoconductive drum 19, so as to visualize the static latent image. The toner image carried by the photoconductive drum 19 on its surface is transferred to the paper 3 while the paper 3 passes through between the photoconductive drum 19 and the transfer roller 21, by a transfer bias voltage applied to the transfer roller 21.

The fixing unit 26 includes a heat roller 24, and a pressure roller 25 that presses the paper 3 against the heat roller 24, and serves to thermally fix on the paper 3 the toner image which has been transferred thereto. The paper 3 subjected to the thermal fixing is then conveyed to a discharge roller 27 located at an upper position inside the main body casing 2, to be discharged by the discharge roller 27 into a discharge tray 29 provided on an upper face of the main body casing 2.

Above the main body casing 2, a source reading apparatus 30 is provided. The source reading apparatus 30 includes a rectangular source document table 31, a reading unit 32 that reads the image on the source document placed on the source document table 31, and an automatic source document feeder 33 that supplies the source document to the source document table 31. On an upper surface of a front end portion of the source reading apparatus 30, an operation panel 98 including various operating buttons and a display unit 99 including an LCD panel or the like are provided.

Figure 2:
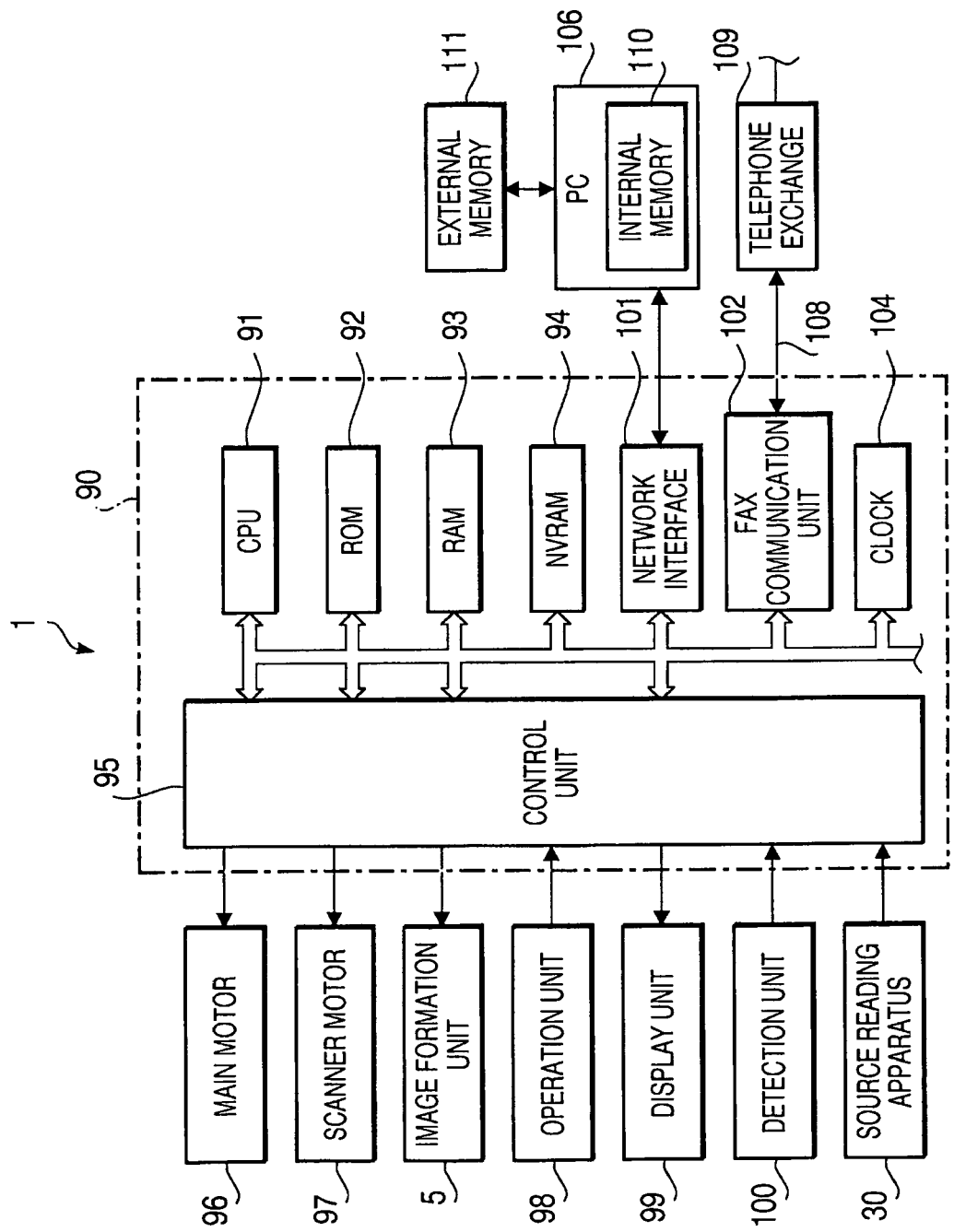
FIG. 2 is a block diagram showing an electrical configuration of the facsimile apparatus shown in FIG. 1.

FIG. 2 is a block diagram showing an electrical configuration of the facsimile apparatus 1 shown in FIG. 1. The facsimile apparatus 1 includes, as shown in FIG. 2, a control unit that controls the constituents via a controller 95 including a CPU 91, a ROM 92, a RAM 93, a NVRAM (Non-volatile RAM) 94, and an ASIC (Application Specific Integrated Circuit, not shown). In addition, a main motor 96, the scanner motor 12A, the image formation unit 10, the operation panel 98, the display unit 99, a detection unit 100 including various sensors, and the source reading apparatus 30 are provided, all of which are electrically connected to the controller 95, thus constituting an overall control system.

The CPU 91 ("printing controller" and "memory controller" of the present invention) executes various arithmetic processes for performing the functions of the facsimile apparatus 1, thus acting as the center of the control unit. The ROM 92 stores therein various programs to be executed by the CPU 91 and data such as fonts. The RAM 93 ("storage unit" of the present invention) is utilized as a data storage region for a work memory and data required when the CPU 91 executes the arithmetic processes. The NVRAM 94, which is a non-volatile memory, stores therein various settings input by the user. The controller 95 controls operation of the functional components including the main motor 96, the scanner motor 12A, and the image formation unit 10 (such as exposure by the scanning unit 11 and the transfer bias when transferring the toner from the photoconductive drum 19 to the paper 3) based on an instruction from the CPU 91. Here, the main motor 96 serves to rotate the photoconductive drum 19, the transfer roller 21, the heat roller 24, the resist roller 6 and others in synchronization.

The control unit 90 also includes a network interface 101 ("connector" of the present invention) via which an external apparatus such as a personal computer 106 ("information processor" of the present invention) is to be connected, a FAX communication unit 102 ("receiver" of the present invention) that transmits and receives the FAX data to and from outside, and a clock 104.

The facsimile communication unit 102 includes a network control unit (hereinafter, NCU) connected to a telephone line 108 so as to control the line, a modem that modulates and demodulates information to be transmitted and transmits and receives process signals for transmission control, and a buffer that temporarily stores therein FAX data including coded image information transmitted from and to an opposite party transmitter (for example, a facsimile apparatus). The NCU receives via the telephone line 108 a call signal from a phone exchange 109 and the telephone number of the opposite party, and transmits a calling dial signal according to button manipulation on the control panel 98, to the phone exchange 109. The NCU also transmits and receives an analog sound signal during a call.

The CPU 91 controls and drives the respective components so as to perform their functions as described above, to thereby form on the paper 3 an image based on the image data input by the personal computer 106 via the network interface 101 and the FAX data received from the opposite party via the facsimile communication unit 102.

An operation process performed by the CPU 91 when receiving the FAX data will be described referring to flowcharts shown in FIGS. 3 to 6.

Upon receipt of a request for acceptance of a call from an external facsimile apparatus or the like, the CPU 91 executes the receiving process, and then the printing process parallel to the receiving process. In the receiving process shown in FIG. 3, the CPU 91 firstly secures a data memory region for the FAX data and a work region for extending the FAX data, in the RAM 93 (S101). The capacity of the data memory region is determined based on the vacant capacity of the RAM 93. Then the FAX data received via the FAX communication unit 102 is sequentially stored in the data memory region in the RAM 93 (S102), and decides, upon completion of receipt of the FAX data corresponding to one page, whether the FAX data contains a following page (S103). If the FAX data contains the following page (S103: YES), the FAX data for the next page is received and stored in the RAM 93. If the FAX data is only for one page (S103: NO), the receiving process is finished.

Figure 4:
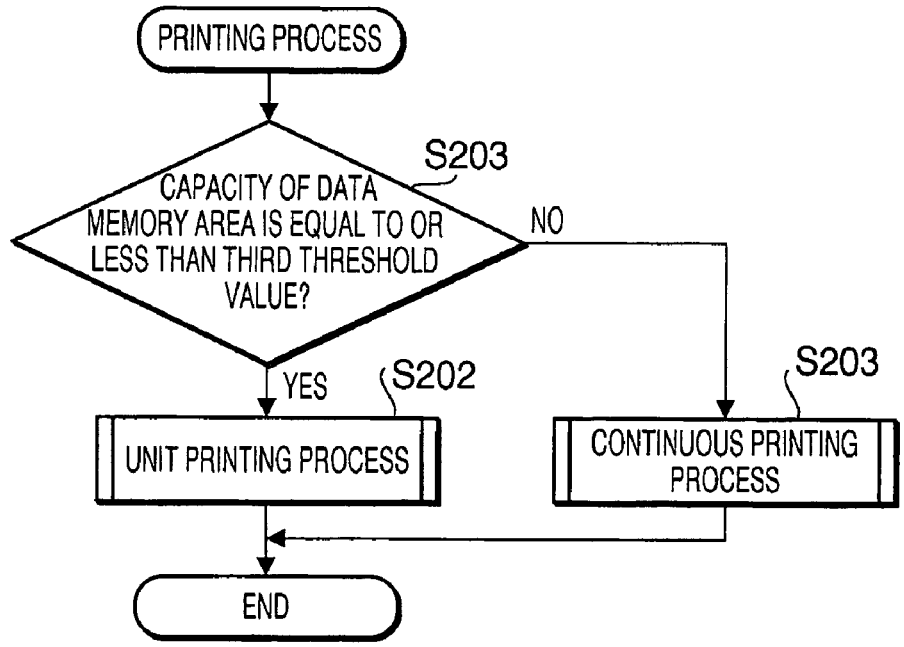
FIG. 4 is a flowchart showing a printing process according to the first embodiment.

In the printing process shown in FIG. 4, the CPU 91 first decides whether the capacity of the data memory region in the RAM 93 is equal to or less than the third threshold value (S201). The third threshold value may be set at a value corresponding to the FAX data for, for example, three to four pages. If the capacity of the data memory region is equal to or less than the third threshold value (S201: YES), the CPU 91 causes the image formation unit 10 to perform the unit printing action, which consumes a smaller capacity in the data memory region (S202). If the capacity of the data memory region is larger than the third threshold value (S201: NO), the CPU 91 causes the image formation unit 10 to perform the continuous printing action, which consumes a larger capacity in the data memory region (S203).

Figure 5:
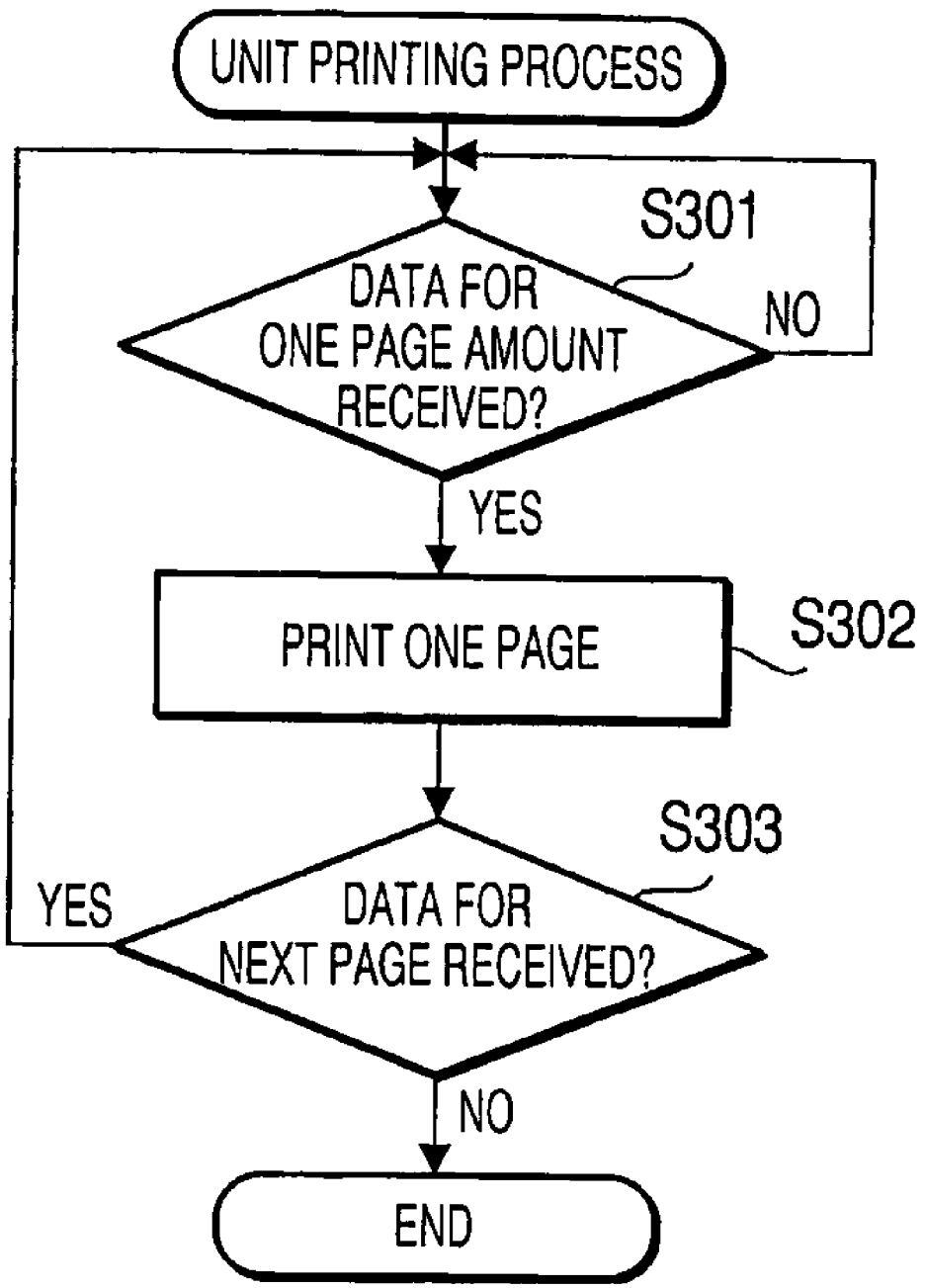
FIG. 5 is a flowchart showing a unit printing process according to the first embodiment.

In the unit printing process shown in FIG. 5, firstly the image formation unit 10 is in the standby mode, waiting for the FAX data for one page to be fully received and stored in the RAM 93 (S301), and upon completion of receipt of the FAX data for one page (S301: YES), the image formation unit 10 executes the printing of the page (S302). To be more detailed, when executing the printing of one page, firstly a preparatory operation for printing is performed, including activating the main motor 96, driving the scanner motor 12A to rotate at a predetermined rotation speed, and heating the fixing unit 26 to a predetermined temperature. Parallel to this, the FAX data for the page is extended on the work region in the RAM 93 into a form of image data. The image data is then transmitted to the scanning unit 11 of the image formation unit 10, so that the image formation unit 10 performs the foregoing steps so as to form an image based on the image data, on a sheet of paper 3. Once the image corresponding to the image data of the page has been printed on the paper 3, the original FAX data corresponding to the page is deleted from the data memory region in the RAM 93.

After completion of the printing of the FAX data for one page, the CPU 91 decides whether the FAX data being received contains the following page (S303), and in the affirmative case (S303: YES), the process returns to S301, and the image formation unit 10 performs the standby mode until the FAX data for the next page is fully received. If the FAX data does not contain any additional page (S303: NO), the unit printing action is finished. Thus in the unit printing process, the standby mode of waiting for the complete receipt of the FAX data corresponding to one page, and the unit printing action of printing the FAX data corresponding to that page are alternately performed, while receiving the FAX data corresponding to a plurality of pages. Accordingly, it suffices that the data memory region has a capacity for the FAX data corresponding to only a few pages, which prevents excessive consumption of the memory capacity.

Figure 6:
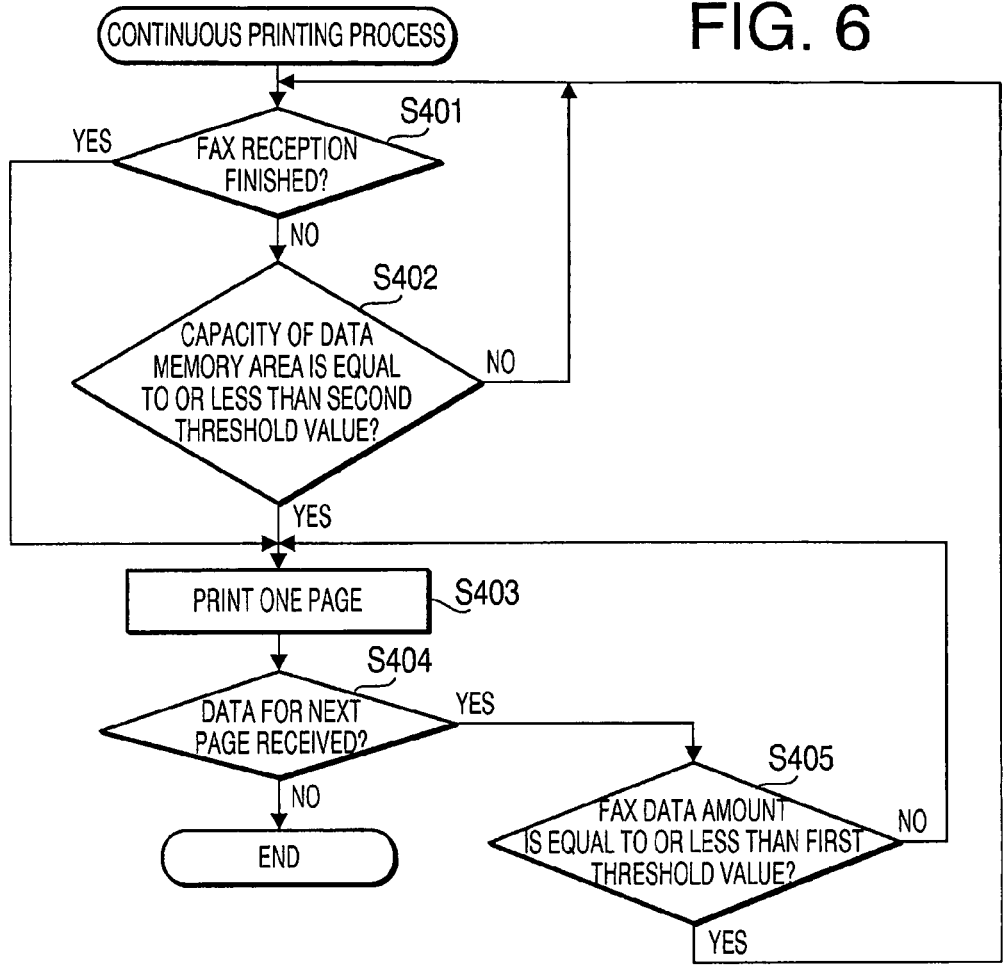
FIG. 6 is a flowchart showing a continuous printing process according to the first embodiment.

In the continuous printing mode shown in FIG. 6, firstly the CPU 91 decides whether the receipt of the FAX (receiving process) has been completed (S401), and in the negative case (S401: NO) the CPU 91 decides whether the vacant capacity of the data memory region in the RAM 93 is equal to or less than the second threshold value (S402). The second threshold value may be set at a value corresponding to the FAX data for, for example, one to two pages. If the CPU 91 decides that the vacant capacity of the data memory region is larger than the second threshold value (S402: NO), the CPU 91 repeats the judgment of S401. Accordingly, the image formation unit 10 remains in the standby mode until the FAX data is fully received, or until the vacant capacity of the data memory region decreases to the second threshold value. If the FAX data corresponding to a plurality of pages is received during the standby mode, therefore, the FAX data corresponding to the plurality of pages is stored in the data memory region of the RAM 93.

When the FAX data has been completely received (completion of the receiving process) (S401: YES) or when the CPU 91 decides that the vacant capacity of the data memory region is equal to or less than the second threshold value (S402: YES), the image formation unit 10 executes the printing of the FAX data corresponding to a most priorly received page (S403). Here, as already stated, the FAX data corresponding to the page that has been printed is deleted from the data memory region. After the first one page has been printed, the PCU 91 decides whether the data memory region contains the FAX data corresponding to a following page (S404), and in the negative case (S404: NO) the continuous printing process is finished. If the FAX data for the following page is stored in the memory region (S404: YES), the CPU 91 decides whether the amount of the FAX data accumulated in the data memory region is equal to or less than the first threshold value (S405). The first threshold value may be set at a value corresponding to the FAX data for, for example, one page. If the amount of the accumulated FAX data is greater than the first threshold value (S405: NO), the process returns to S403, so that the image formation unit 10 executes the printing of the following one page. Accordingly, in the case where the FAX data corresponding to a plurality of pages is accumulated in the data memory region, the printing action for each page is repeated (continued) until the amount of the FAX data becomes equal to or less than the first threshold value, and resultantly the image formation unit 10 continuously prints the FAX data corresponding to all the pages except the halfway received page, or the final page if the entire FAX data has been received. On the other hand, if the amount of the accumulated FAX data is equal to or less than the first threshold value (S405: YES), the process returns to S401, where the CPU 91 decides whether the FAX has been completely received. In the affirmative case (S401: YES), the process proceeds to S403 so as to print the FAX data of the final page, after which NO is selected at S404 thus to finish the continuous printing process. If the FAX is still being received (S401: NO), the image formation unit 10 performs the standby mode until the FAX is fully received, or until the vacant capacity of the data memory region becomes equal to or less than the second threshold value (S401 or S402).

Thus in the continuous printing process, when the FAX data corresponding to a number of pages is received, the image formation unit 10 alternately performs the standby mode of suspending the printing action pending the accumulation of the FAX data corresponding to a plurality of pages in the data memory region, and the continuous printing action of continuously printing the FAX data corresponding to the plurality of pages accumulated in the data memory region. Such arrangement reduces the number of times that the printing action is started and stopped, compared to the case of performing the unit printing process.

The foregoing embodiment provides the following advantageous effects. The image formation unit 10 alternately performs the standby mode of suspending the printing action pending the accumulation of the FAX data corresponding to a plurality of pages in the RAM 93, and the continuous printing action of continuously printing the FAX data corresponding to the plurality of pages stored in the RAM 93. Such arrangement permits the printing unit to continuously print, after once starting the printing action and suspending, the FAX data corresponding to a plurality of pages after the FAX data corresponding to the plurality of pages is fully received, instead of starting and suspending the printing action each time the FAX data for one page is received, thereby effectively restricting the intermittent printing.

When the amount of the FAX data stored in the RAM 93 becomes equal to or less than the first threshold value, the image formation unit 10 is switched from the continuous printing action to the standby mode. In other words, when the amount of the FAX data remaining in the RAM 93 becomes scarce, the image formation unit 10 is switched to the standby mode of waiting for the FAX data corresponding to a plurality of pages to be accumulated in the RAM 93, and then switched to the continuous printing action to print the plurality of pages newly accumulated, thereby effectively restricting the intermittent printing.

Also, when the vacant capacity of the data memory region in the RAM 93 becomes equal to or less than the second threshold value, the image formation unit 10 is activated to perform the continuous printing action. Such arrangement allows accumulating the FAX data until the vacant capacity of the data memory region decreases to the predetermined value while the image formation unit 10 is in the standby mode, thereby preventing occurrence of an error originating from shortage of the vacant capacity in the RAM 93.

Further, when the capacity of the data memory region in the RAM 93 is equal to or less than the third threshold value, the image formation unit 10 performs the unit printing action of printing the FAX data corresponding to one page (one unit) each time the FAX data corresponding to one page (one unit) is stored in the RAM 93. Such arrangement prevents occurrence of an error originating from shortage of the capacity in the RAM 93.

Second Embodiment

Figure 7:
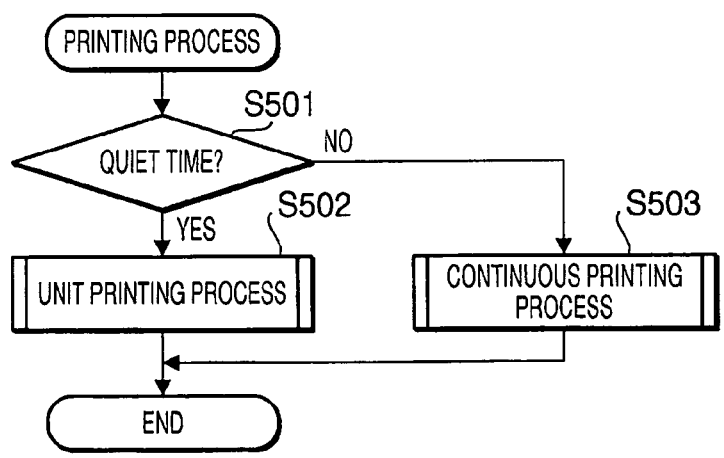
FIG. 7 is a flowchart showing a data receiving process according to a second embodiment.

Referring now to FIG. 7, a facsimile apparatus according to a second embodiment of the present invention will be described. In this embodiment, the facsimile apparatus is designed to perform the unit printing mode and the continuous printing mode as described regarding the foregoing embodiment, such that these modes are switched according to a time zone preset by the user. Specifically, when the user inputs from the operation panel 98 a time zone for example called "quiet time", during which the quietness of the facsimile apparatus is of primary importance, such zone is stored in the NVRAM 94.

Figure 3:
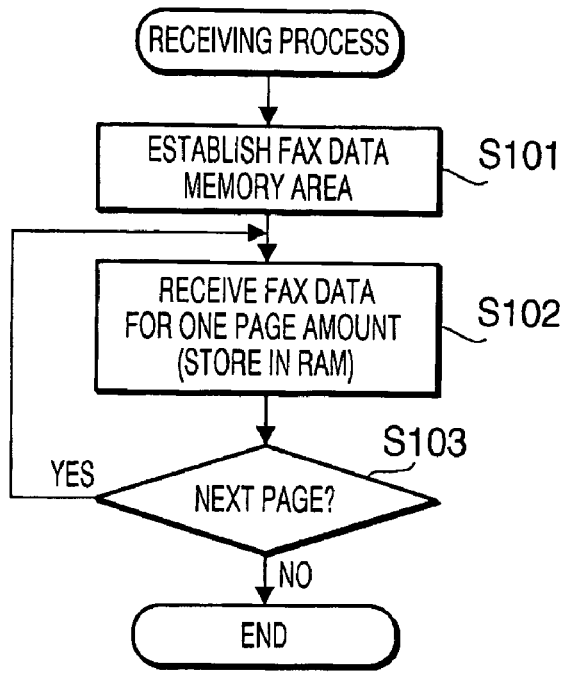
FIG. 3 is a flowchart showing a data receiving process according to the first embodiment.

When receiving the FAX data, the printing process as shown in FIG. 7 is performed parallel to the receiving process (similar to FIG. 3). In the printing process, the CPU 91 first looks up the time zone setting in the NVRAM 94 and the clock 104, to thereby decide whether the current time is within the zone of the quiet time (S501). In the negative case (S501: NO), the image formation unit 10 performs the unit printing process (S502, details are as FIG. 5), while in the affirmative case (S501: YES), the image formation unit 10 performs the continuous printing process (S503, details are as FIG. 6).

The facsimile apparatus according to this embodiment may be set such that, for example, the unit printing mode is selected so as to alleviate the load of the RAM 93, during the daytime when the RAM 93 is more prone to incur shortage in capacity because a number of users utilize the facsimile apparatus in various manners, and the continuous printing mode is selected so as to restrict the intermittent printing, during the night time when quietness is of primary importance.

Third Embodiment

Figure 8:
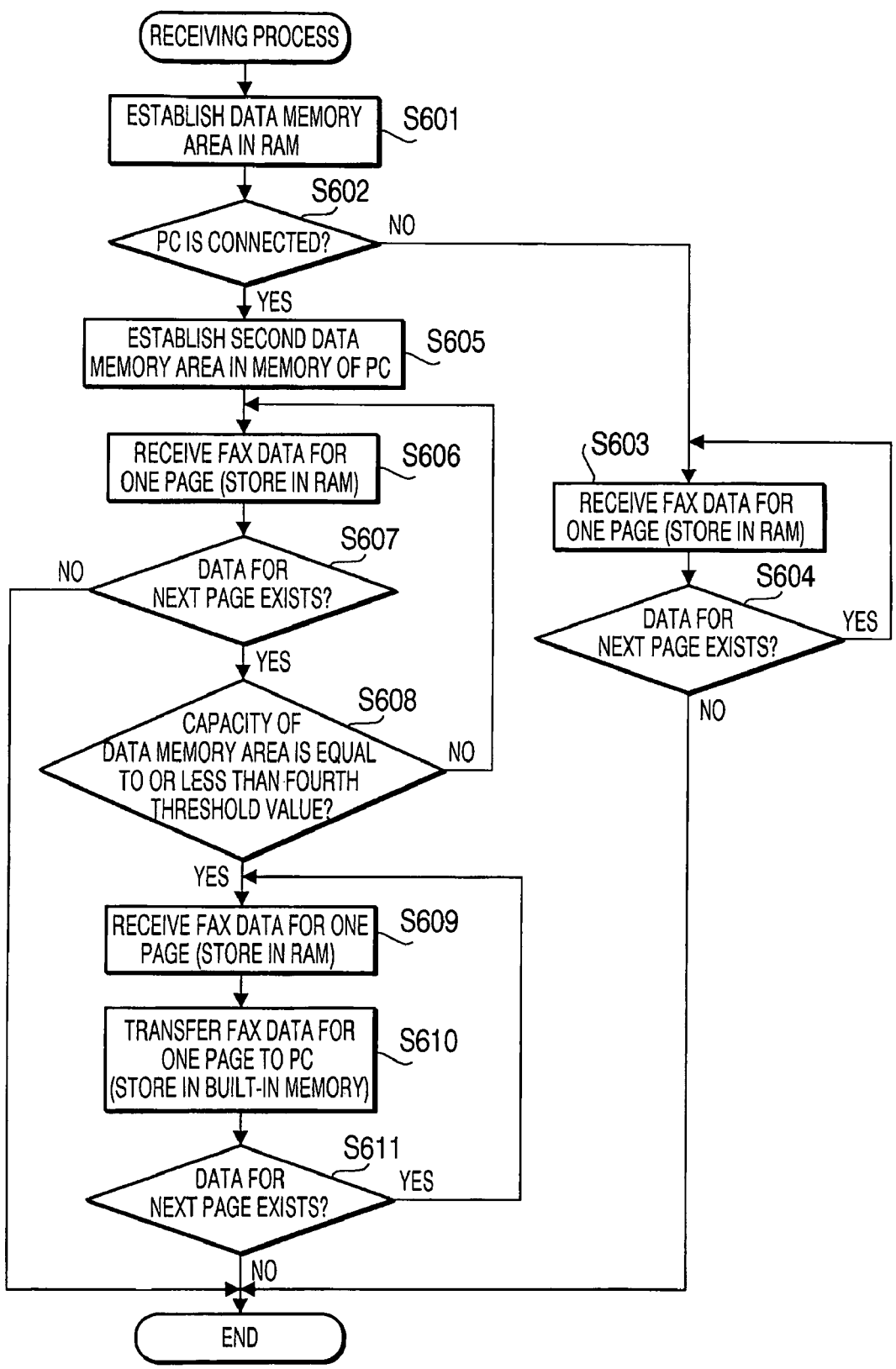
FIG. 8 is a flowchart showing a data receiving process according to a third embodiment.

Referring now to FIG. 8, a facsimile apparatus according to a third embodiment of the present invention will be described. In this embodiment, the facsimile apparatus executes the receiving process shown in FIG. 8, upon receipt of the FAX data. In this process, the CPU 91 first secures the data memory region for storing the FAX data on the RAM 93 (S601). The CPU 91 then decides whether the external personal computer 106 is connected to the network interface 101 (S602). In the negative case (S602: NO), the CPU 91 sequentially stores the received FAX data in the data memory region in the RAM 93 (S603), and decides, upon complete receipt of the FAX data corresponding to one page, whether the FAX data still contains a following page (S604). In the affirmative case (S604: YES), the CPU 91 successively receives the FAX data for the next page and stores that data in the RAM 93, while in the negative case (S604: NO) the CPU 91 finishes the receiving process. Thus, when the external personal computer 106 is not connected, the received FAX data is stored exclusively in the RAM 93, as in the first embodiment.

On the other hand, when the external personal computer 106 is connected to the network interface 101 (S602: YES), the CPU 91 first secures a second data memory region for storing the FAX data in the internal memory (RAM, hard disk or the like) 110 ("external storage unit" of the present invention) installed in the personal computer 106 (S605). Then the CPU 91 stores the received FAX data corresponding to one page in the data memory region in the RAM 93 (S606), and then decides whether the FAX data still contains a following page (S607). In the negative case (S607: NO), the CPU 91 finishes the receiving process. In the affirmative case (S607: YES), the CPU 91 decides whether the vacant capacity of the data memory region in the RAM 93 is equal to or less than the fourth threshold value (S608). The fourth threshold value may be set at a value corresponding to the FAX data for, for example, one or two pages. If the vacant capacity of the data memory region is larger than the fourth threshold value (S608: NO), the process returns to S606, so as to receive the FAX data corresponding to the next one page and stores such data in the data memory region of the RAM 93. Accordingly, when the FAX data corresponding to a number of pages is received, the received FAX data is stored in the RAM 93 until the vacant capacity of data memory region in the RAM 93 becomes equal to or less than the fourth threshold value.

When the vacant capacity of data memory region becomes equal to or less than the fourth threshold value (S608: YES), the CPU 91 stores the FAX data corresponding to the immediate next page, in the RAM 93 (S609). The CPU 91 then transfers the FAX data corresponding to the page received at S609 to the personal computer 106, to store that FAX data in the second data memory region in the internal memory 110. Here, the FAX data transferred from the RAM 93 to the personal computer 106 is deleted from the RAM 93. The CPU 91 now decides whether the FAX data still contains a following page (S611), and in the negative case (S611: NO) the CPU 91 finishes the receiving process. In the affirmative case (S611: YES), the process returns to S609, so as to temporarily store the FAX data for the following page in the RAM 93 and then transfer that data to the personal computer 106 (S610), and further repeat the same process if the case applies.

Parallel to the foregoing receiving process, the printing process is performed in a similar manner to the first embodiment (refer to FIGS. 4 to 6). In the printing process in this case, when the personal computer 106 is connected to the network interface 101, the calculation of the capacity and other processes are executed based on the data memory region in the RAM 93, as well as on the second data memory region in the internal memory 110 as the data memory region. Further, when the removable external memory 111 (such as a flash memory) is connected to the personal computer 106, the FAX data may be stored in the external memory 111 instead of the internal memory 110, as the external storage unit.

Thus, according to this embodiment, the FAX data can be stored in the external storage unit (internal memory 110, external memory 111) in addition to the storage unit (RAM 93) provided in the facsimile apparatus 1, and therefore a greater amount of FAX data can be stored at a time. Such arrangement enables continuously printing a greater number of pages, thereby enhancing the restricting effect against the intermittent printing.

Also, in the case, for example, where the vacant capacity of the storage unit (RAM 93) and the external storage unit (internal memory 110 or external memory 111) both becomes scarce while receiving the FAX data (during the standby mode), activating the continuous printing action prevents occurrence of an error originating from the shortage in capacity. Then after the continuous printing action is completed, performing the standby mode until the FAX data corresponding to a plurality of pages is accumulated in the storage unit or the external storage unit, and again activating the continuous printing action effectively restricts the intermittent printing.

In addition, the FAX data can be first stored in the storage unit (RAM 93) and even when the vacant capacity of the storage unit (RAM 93) becomes scarce the FAX data can be successively stored in the external storage unit (internal memory 110 or external memory 111). Utilizing thus the storage unit (RAM 93) with priority alleviates the load imposed on the part of the external storage unit (internal memory 110 or external memory 111).

The present invention is not limited to the foregoing embodiments, but may be modified in various manners without deviating from the technical scope of the present invention. A couple of such modifications are given below.

(1) While the foregoing embodiments refer to a facsimile apparatus that employs an electrophotography, the present invention may also be applied to another printing type (e.g., an ink-jet type) facsimile apparatus. In the case of the ink-jet type facsimile apparatus, the FAX data corresponding to, for instance, one line may be treated as one unit in the unit printing process.

(2) Although the received FAX data is stored in the internal memory installed in the personal computer (information processor) or in the removable external memory connected thereto in the one of the embodiments, the facsimile apparatus may be provided with a connector (such as a USB interface or a card slot) that enables direct connection to an external storage unit, so as to store the FAX data in the external storage unit (such as a flash memory).

What is claimed is:

1. A facsimile apparatus, comprising:
a receiver that receives facsimile data;
a storage unit including a data memory region that stores therein the facsimile data;
a printing unit that prints an image based on the facsimile data; and
a printing controller that controls the printing unit, during receipt of the facsimile data, to execute a printing operation in which the printing unit alternately operates, as the printing operation, in a standby mode and in a continuous mode, wherein in the standby mode, a printing action is suspended and the facsimile data corresponding to a plurality of pages is stored in the storage unit, and in the continuous mode, the facsimile data corresponding to the plurality of pages stored in the storage unit is continuously printed out by the printing unit,
wherein the printing controller switches the printing mode from the continuous mode to the standby mode when an amount of the facsimile data stored in the storage unit is equal to or less than a first threshold value which is more than zero, and the amount of the facsimile data stored in the storage unit is not zero.

2. The facsimile apparatus according to claim 1, wherein the printing controller switches the printing mode from the standby mode to the continuous mode when an available capacity of the data memory region in the storage unit is equal to or less than a second threshold value.

3. The facsimile apparatus according to claim 1, wherein the printing unit is configured to print the image in accordance with an electrophotographic image formation method.

4. The facsimile apparatus according to claim 1, wherein the storage unit is a RAM.

5. The facsimile apparatus according to claim 1, wherein, upon finishing the receipt of the facsimile data, the printing controller is configured to print out the facsimile data which have not been printed out.

6. A facsimile apparatus, comprising:
a receiver that receives facsimile data;
a storage unit including a data memory region that stores therein the facsimile data;
a printing unit that prints an image based on the facsimile data; and
a printing controller that controls the printing unit, during receipt of the facsimile data, to execute a printing operation in which the printing unit alternately operates, as the printing operation, in a standby mode and in a continuous mode, wherein in the standby mode, a printing action is suspended and the facsimile data corresponding to a plurality of pages is stored in the storage unit, and in the continuous mode, the facsimile data corresponding to the plurality of pages stored in the storage unit is continuously printed out by the printing unit, wherein, when the capacity of the data memory region in the storage unit becomes equal to or less than a third threshold value, the printing controller causes the printing unit to alternately perform a second standby mode in which the printing action is suspended and waiting for the facsimile data corresponding to a unit amount to be stored in the storage unit, and in unit printing mode in which a unit printing action of printing the facsimile data corresponding to the unit amount stored in the storage unit.

7. A facsimile apparatus, comprising:
a receiver that receives facsimile data;
a storage unit including a data memory region that is configured to store therein the facsimile data;
a connector that provides connection with an external storage unit that is configured to store therein the facsimile data;
a printing unit that prints an image based on the facsimile data; and
a memory controller that stores the facsimile data received by the receiver in one of the storage unit and the external storage unit; and
a printing controller that controls the printing unit, during receipt of the facsimile data, to execute a printing operation in which the printing unit alternately operates, as the printing operation, in a standby mode and in a continuous mode, wherein in the standby mode, a printing action is suspended and the memory controller controls the facsimile data corresponding to a plurality of pages to be stored in the one of the storage unit and the external storage unit, and in the continuous mode, the facsimile data corresponding to the plurality of pages stored, under control of the memory controller, in the one of the storage unit and the external storage unit is continuously printed out by the printing unit,
wherein the printing controller switches the printing mode from the continuous mode to the standby mode when an amount of the facsimile data stored in the storage unit is equal to or less than a first threshold value which is more than zero, and the amount of the facsimile data stored in the storage unit is not zero.

8. The facsimile apparatus according to claim 7, wherein upon finishing the receipt of the facsimile data, the printing controller is configured to print out the facsimile data which have not been printed out.

9. The facsimile apparatus according to claim 7, wherein the memory controller first stores the facsimile data in one of the storage unit and the external storage unit when receiving the facsimile data, and successively stores the facsimile data in the other of the storage unit and the external storage unit when an available capacity of the one of the storage unit and the external storage unit becomes equal to or less than a fourth threshold value.

10. The facsimile apparatus according to claim 9, wherein the memory controller first stores the facsimile data in the storage unit when receiving the facsimile data, and successively stores the facsimile data in the external storage unit when an available capacity of the storage unit becomes equal to or less than the fourth threshold value.

11. The facsimile apparatus according to claim 7, wherein the connector provides connection with an information processor having an internal memory, the memory controller being configured to utilize the internal memory as the external storage unit.

12. The facsimile apparatus according to any of claim 7, wherein the connector provides connection with an information processor to which an external memory is removably attachable, the memory controller being configured to utilize the external memory as the external storage unit.

13. The facsimile apparatus according to claim 7, wherein the printing unit is configured to print the image in accordance with an electrophotographic image formation method.

14. A facsimile apparatus, comprising:
a receiver that receives facsimile data;
a storage unit including a data memory region that stores therein the facsimile data;
a printing unit that prints an image based on the facsimile data; and
a printing controller that switches an operation of the printing unit, during receipt of the facsimile data, between a continuous printing mode in which the facsimile data corresponding to a plurality of units is stored in the storage unit and then the facsimile data corresponding to the plurality of units are continuously printed, and a unit printing mode in which the facsimile data corresponding to a unit is printed every time when the facsimile data corresponding to a unit is stored in the storage unit,
wherein the continuous printing mode and the unit printing mode are switched according to a time zone,
in the continuous printing mode, a remaining capacity of the storage unit is monitored and printing operation is executed so that the remaining capacity does not exceed a predetermined threshold value, and
the printing controller switches the printing mode from the continuous mode to the standby mode when an amount of the facsimile data stored in the storage unit is equal to or less than a first threshold value which is more than zero, and the amount of the facsimile data stored in the storage unit is not zero.

15. The facsimile apparatus according to claim 14, wherein the printing unit is configured to print the image in accordance with an electrophotographic image formation method.

16. A method for controlling printing operation of a facsimile apparatus provided with a receiver that receives facsimile data, a storage unit including a data memory region that stores therein the facsimile data, and a printing unit that prints an image based on the facsimile data, the method comprising the steps of:
first controlling the printing unit, during receipt of the facsimile data, to operate in a standby mode in which a printing action is suspended and the facsimile data corresponding to a plurality of pages is stored in the storage unit;
second controlling the printing unit in a continuous mode in which the facsimile data corresponding to the plurality of pages stored in the storage unit is continuously printed out by the printing unit, wherein
the first controlling and the second controlling are executed alternately, and
the printing mode is switched from the continuous mode to the standby mode when an amount of the facsimile data stored in the storage unit is equal to or less than a first threshold value which is more than zero, and the amount of the facsimile data stored in the storage unit is not zero.

17. The method of claim 16, wherein, upon finishing the receipt of the facsimile data, the facsimile data which have not been printed out is printed out.

18. A method for controlling printing operation of a facsimile apparatus provided with a receiver that receives facsimile data, a storage unit including a data memory region that stores therein the facsimile data, and a printing unit that prints an image based on the facsimile data, the method comprising the steps of:

first operating the printing unit, during receipt of the facsimile data, between a continuous printing mode in which the facsimile data corresponding to a plurality of units is stored in the storage unit and then the facsimile data corresponding to the plurality of units are continuously printed; and second operating the printing unit, during receipt of the facsimile data, in a unit printing mode in which the facsimile data corresponding to a unit is printed every time when the facsimile data corresponding to a unit is stored in the storage unit, switching the continuous printing mode and the unit printing mode according to a time zone, wherein in the continuous printing mode, a remaining capacity of the storage unit is monitored and printing operation is executed so that the remaining capacity does not exceed a predetermined threshold value, and the printing mode is switched from the continuous mode to the standby mode when an amount of the facsimile data stored in the storage unit is equal to or less than a first threshold value which is more than zero, and the amount of the facsimile data stored in the storage unit is not zero.

19. The method of claim 18, wherein, upon finishing the receipt of the facsimile data, the facsimile data which have not been printed out is printed out.

* * * * *